(12) United States Patent
Heffernan et al.

(10) Patent No.: US 11,829,901 B2
(45) Date of Patent: *Nov. 28, 2023

(54) METHODS AND APPARATUS TO IDENTIFY PUBLISHER ADVERTISING BEHAVIOR

(71) Applicant: The Nielsen Company (US), LLC, New York, NY (US)

(72) Inventors: Ronan Heffernan, Wesley Chapel, FL (US); Chad A. Hage, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/011,194

(22) Filed: Jun. 18, 2018

(65) Prior Publication Data

US 2018/0365721 A1    Dec. 20, 2018

Related U.S. Application Data (63) Continuation of application No. 14/529,315, filed on Oct. 31, 2014, now Pat. No. 10,002,365.

(51) Int. Cl.
| | |
|---|---|
| *G06Q 30/02* | (2023.01) |
| *G06Q 30/0204* | (2023.01) |
| *G06Q 30/0241* | (2023.01) |
| *G06Q 30/0251* | (2023.01) |
| *G06Q 30/0242* | (2023.01) |
| *G06Q 30/0273* | (2023.01) |

(Continued)

(52) U.S. Cl.
CPC ......... *G06Q 30/0205* (2013.01); *G06Q 30/02* (2013.01); *G06Q 30/0202* (2013.01); *G06Q 30/0203* (2013.01); *G06Q 30/0204* (2013.01); *G06Q 30/0241* (2013.01); *G06Q 30/0242* (2013.01); *G06Q 30/0251* (2013.01); *G06Q 30/0273* (2013.01); *G06Q 30/0277* (2013.01)

(58) Field of Classification Search
None
See application file for complete search history.

(56) References Cited

U.S. PATENT DOCUMENTS

| | | |
|---|---|---|
| 6,449,739 B1 | 9/2002 | Landan |
| 6,606,525 B1 | 8/2003 | Muthuswamy et al. |

(Continued)

FOREIGN PATENT DOCUMENTS

WO    WO-2015187485 A1 * 12/2015 ......... G06Q 30/0275

OTHER PUBLICATIONS

Digital Envoy, Inc., "NetAcuity IP Intelligence Whitepaper," 2002-2003, 10 pages.

(Continued)

*Primary Examiner* — Brian M Epstein (57) ABSTRACT

Methods, apparatus, systems and articles of manufacture are disclosed to identify publisher advertising behavior. An example disclosed method includes initiating a first probing effort of an Internet publisher of interest to establish a baseline advertising ratio for a plurality of advertisers, determining a first advertising deviation based on a difference between the baseline advertising and a local advertising associated with a first geography of interest, and establishing a first probing frequency for the first geography of interest based on the first advertising deviation.

28 Claims, 8 Drawing Sheets

| CNN.com | AD RATIO VALUE |
|---|---|
| Coke | 13% |
| Pepsi | 17% |
| AARP | 6% |
| AXE Body Spray | 10% |
| Chevy | 22% |
| BMW | 14% |
| McDonalds | 12% |
| Walmart | 6% |
| | Σ 100% |

| ESPN.com | AD RATIO VALUE |
|---|---|
| Coke | 24% |
| Pepsi | 11% |
| AARP | 9% |
| Wendy's | 13% |
| Chevy | 13% |
| Ford | 9% |
| McDonalds | 7% |
| Walmart | 14% |
| | Σ 100% |

(51) Int. Cl.
*G06Q 30/0202* (2023.01)
*G06Q 30/0203* (2023.01)

(56) References Cited

U.S. PATENT DOCUMENTS

| | | | |
|---|---|---|---|
| 6,973,489 B1 | 12/2005 | Levy | |
| 7,533,084 B2 | 5/2009 | Holloway et al. | |
| 7,546,368 B2 | 6/2009 | Drees et al. | |
| 7,865,546 B1 | 1/2011 | Tuzhilin et al. | |
| 8,370,485 B2 | 2/2013 | Drees et al. | |
| 8,631,116 B2 | 1/2014 | Wunderlich | |
| 2005/0028188 A1* | 2/2005 | Latona | G06Q 30/0242 725/23 |
| 2005/0235030 A1 | 10/2005 | Lauckhart et al. | |
| 2009/0099904 A1* | 4/2009 | Affeld | G06Q 30/0244 705/14.43 |
| 2012/0053991 A1 | 3/2012 | Shimizu et al. | |
| 2012/0072469 A1* | 3/2012 | Perez | G06Q 10/067 707/810 |
| 2014/0068411 A1 | 3/2014 | Ross et al. | |
| 2014/0365298 A1* | 12/2014 | Tang | G06Q 30/02 705/14.48 |
| 2016/0125440 A1 | 5/2016 | Heffernan et al. | |
| 2016/0364935 A1* | 12/2016 | Koehler | G06Q 30/0249 |

OTHER PUBLICATIONS

United States Patent and Trademark Office, "Corrected Notice of Allowance," issued in connection with U.S. Appl. No. 14/529,315, dated Feb. 9, 2018, 4 pages.

United States Patent and Trademark Office, "Non-final Office Action," issued in connection with U.S. Appl. No. 14/529,315, dated Aug. 11, 2017, 23 pages.

United States Patent and Trademark Office, "Notice of Allowance," issued in connection with U.S. Appl. No. 14/529,315, dated Jan. 18, 2018, 8 pages.

Srinivasan et al., "SPAND: Shared Passive Network Performance Discovery," USENIX Symposium on Internet Technologies and Systems, Monterrey, California, Dec. 1997, 13 pages.

* cited by examiner

| CNN.com (204) | AD RATIO DEVIATION (206) |
|---|---|
| Coke (250) | NY = +1% ← 220<br>FL = +1%<br>AL = -2% ← 222 |
| Pepsi | NY = -2%<br>FL = +3%<br>AL = +1% |
| AARP | NY = -2%<br>FL = +7%<br>AL = -9% |
| AXE Body Spray | NY = +3%<br>FL = -2%<br>AL = -7% |
| Chevy | NY = -4%<br>FL = +2%<br>AL = +1% |
| BMW | NY = +5%<br>FL = +2%<br>AL = -3% |
| McDonalds | NY = -7%<br>FL = -1%<br>AL = +4% |
| Walmart | NY = -5%<br>FL = +2%<br>AL = +6% |

210

| ESPN.com (212) | AD RATIO DEVIATION (214) |
|---|---|
| Coke | NY = -20% ← 224<br>FL = +14%<br>AL = +30% ← 226 |
| Pepsi | NY = +14%<br>FL = -2%<br>AL = -9% |
| AARP | NY = -1%<br>FL = +30%<br>AL = -17% |
| Wendy's | NY = +11%<br>FL = -21%<br>AL = -32% |
| Chevy | NY = +20%<br>FL = -13%<br>AL = -40% |
| Ford | NY = -30%<br>FL = +14%<br>AL = +38% |
| McDonalds | NY = -18%<br>FL = +12%<br>AL = +42% |
| Walmart | NY = -31%<br>FL = -2%<br>AL = +26% |

| CNN.com /302 | AD RATIO DEVIATION /304 |
|---|---|
| Coke  ← 306 | NY = +1%<br>FL = -21%<br>AL = -2% |
| Pepsi | NY = -2%<br>FL = -34%<br>AL = +1% |
| AARP  ← 308<br>← 310 | NY = -2%<br>FL = +200%<br>AL = -9% |
| AXE Body Spray | NY = +3%<br>FL = -26%<br>AL = -7% |
| Chevy | NY = -4%<br>FL = -11%<br>AL = +1% |
| BMW | NY = +5%<br>FL = -18%<br>AL = -3% |
| McDonalds | NY = -7%<br>FL = -14%<br>AL = +4% |
| Walmart | NY = -5%<br>FL = -27%<br>AL = +6% |

METHODS AND APPARATUS TO IDENTIFY PUBLISHER ADVERTISING BEHAVIOR

RELATED APPLICATION

This patent is a continuation of, claims the benefit of and priority to previously filed U.S. patent application Ser. No. 14/529,315, entitled "METHODS AND APPARATUS TO IDENTIFY PUBLISHER ADVERTISING BEHAVIOR," filed Oct. 31, 2014. The subject matter of this application is incorporated herein by reference in its entirety.

FIELD OF THE DISCLOSURE

This disclosure relates generally to market research, and, more particularly, to methods and apparatus to identify publisher advertising behavior.

BACKGROUND

Media research efforts include identifying instances of media presentation via various media delivery systems. In some cases, broadcast television broadcasts are monitored to identify which commercials and/or programs are presented at corresponding times of day. In other cases, radio broadcasts are monitored to identify one or more radio advertisements presented at corresponding times of day. The collected media information may be further analyzed to identify one or more aspects of advertising behavior.

DETAILED DESCRIPTION

Market researchers seek to understand local markets in many different ways. In some examples, market researchers study and/or collect information associated with audience behaviors, and/or demographics of the audience member. In other examples, market researchers study and/or collect information associated with products and/or services of advertisers, merchants, retailers, wholesalers and/or other commercial entities. The information associated with the merchants, retailers, wholesalers, other commercial entities products and/or services offered to consumers is generally identified through advertising behavior.

Internet-based advertising allows particular advertisements to be presented on web pages that are sourced by Internet publishers. Example Internet publishers include, but are not limited to business news publishers (e.g., CNN, FOX, HLN, Bloomberg), sports publishers (e.g., ESPN), entertainment news publishers (e.g., E! Online) and/or weather news publishers (e.g., The Weather Channel). In some examples, the Internet publisher will reserve one or more portions of its web page(s) to host advertisements that are available for purchase. These portions of web pages reserved for advertising purposes are referred to herein as "ad space." The ad space may be purchased by the aforementioned advertising merchants, retailers, wholesalers, and/or other commercial entities (e.g., manufactures/suppliers of products and/or services) so that visitors to the web page(s) are exposed to corresponding advertisements.

In some examples, the Internet publisher's web page presents the same advertisement(s) in the purchased ad space regardless of the geography in which the web page is rendered. For example, a cola manufacturer (e.g., Coke) may purchase ad space from a national news publisher (e.g., CNN) such that a viewer sees the cola advertisement when the web page is accessed from a web page browsing device (e.g., a computing device (e.g., a personal computer, a wireless telephone, a tablet, etc.) with a web browser) irrespective of the browser physical location (e.g., the same advertisement is displayed by browsers in California, Washington, Maine and Florida). In other words, the advertisement presented in the ad space for the national news publisher does not change based on the geographic location of the rendered web page within the corresponding nation (e.g., the United States).

In some examples, the Internet publisher's web page presents different advertisement(s) in the purchased ad space based on the geographic location of the browser rendering the advertisement. For example, a local sports team in California (e.g., The San Francisco 49ers) may purchase ad space from a sports news publisher (e.g., ESPN) such that a viewer in California sees advertisements for 49ers merchandise and game times. However, a local sports team in Florida (e.g., The Jacksonville Jaguars) may also purchase ad space from the same sports news publisher (e.g., ESPN) such that a viewer in Florida sees advertisements for Jaguars merchandise and game times. In other words, the advertisements associated with the sports news publisher are relatively dependent on the geographic location of the rendered web page.

Ad space allocated by Internet publishers is typically managed by one or more third party advertising networks (ad networks), such as Google Double-Click. The ad networks sell ad space to purchasers (e.g., manufacturers of products/services, syndicated television producers, movie producers, theater companies, etc.) and then the ad networks place the desired advertisements in the ad space without further involvement by the Internet publisher(s). In other words, the Internet publishers allow the ad networks to market the ad space for a fee. In some examples, Internet publishers may manage their own ad space and work directly with one or more purchasers. In either case, market researchers desire information related to which advertisements occur with particular Internet publishers, and whether such advertisements are placed as a function of geography. For example, market researchers desire information related to whether the advertisements occur in a homogeneous manner, a non-homogeneous manner, or any intermediate degree thereof based on one or more geographies of interest. Internet publishers that exhibit a relatively homogeneous presentation of advertisements (e.g., little or no variance across different geographies) are considered to have a relatively lower degree of skew when compared to Internet publishers that exhibit a relatively non-homogeneous presentation of advertisements (e.g., different advertisements in different geographies).

To identify whether an Internet publisher exhibits a particular degree of skew, market researchers initiate web page probes that originate in geographies of interest. For example, the market researcher may own, manage and/or otherwise control one or more web page browsing devices in a first geography of interest and a second geography of interest. The one or more web page browsing devices may be implemented as a server farm within the geography of interest having any number of computers with Internet browsers that are instructed to initiate web page requests on a periodic, aperiodic, scheduled and/or manual basis. When a web page request for a particular Internet publisher of interest (e.g., ESPN via navigation to www.espn.com) is initiated (e.g., a probe) within the first geography of interest (e.g., California), a first advertisement (e.g., an advertisement for the 49ers) may appear within the ad space of the Internet publisher. However, when another web page request for the same Internet publisher of interest is initiated (e.g., a probe) within the second geography of interest (e.g., Florida), a second advertisement (e.g., an advertisement associated with the Jaguars) may appear within the same ad space of the Internet publisher. While the example described above refers to a first advertisement and a second advertisement, examples disclosed herein account for an aggregate number of instances suitable for statistical significance.

In the illustrated example above, a relatively high degree of skew is observed and expected due to the localized sports culture differences between the first and second geographies of interest. However, in some examples an Internet publisher may exhibit different degrees of skew based on any number of factors. For example, a national news publisher (e.g., CNN) may generally exhibit a relatively low amount of skew, in which the same advertisements are placed in the ad space when the web page is accessed from the first geography of interest or the second geography of interest. As used herein, "general skew" is a measure of the degree of non-homogeneous advertising activity for the publisher in particular geographies, and reflects a nominal or steady state value of advertising activity. For instance, the ad space of the national news publisher may have been purchased by a cola manufacturer that wishes to place advertising in both example geographies of interest. On the other hand, and as used herein, a "baseline ad ratio" reflects a proportionate amount of advertising for each advertiser that purchases ad space from the Internet publisher independent of particular geographies of interest.

One or more localized factors may cause skew to increase. Assume, for example, advertisements in the first geographic area of interest differ from the advertisements in the second geographic area of interest. Now, assuming for purposes of illustration that, during a presidential election, the first geography of interest is not a particularly important battleground state for one of the presidential candidates and, thus, the example advertisements from the cola manufacturer continue in the first geographic area without change. However, assume, in this example, that the second geography of interest is a key battleground state for one of the presidential candidates, and that an amount of advertising associated with that candidate occurs and replaces a portion of the advertisements that would otherwise be purchased by the cola manufacturer. As used herein, "special skew" is a metric related to a threshold amount of deviation in advertising behavior from the baseline ad ratio value(s). In some examples, special skew may be identified based on a threshold amount of ad ratio deviation in a geography of interest at one moment in time as compared to a separate moment in time.

Internet publishers that do not exhibit a relatively high degree of skew (e.g., a threshold percentage value) may not require web page probing efforts to occur as frequently when compared to Internet publishers that exhibit a lower degree of skew. As described above, computing resources residing in different geographic locations of interest are used to facilitate one or more probes of the web page. For example, in the event a sample of ad space behavior was desired from each state in the United States, then fifty (50) separate server farms may be allocated to the United States in which one server farm is placed in each of the 50 states. While the example above refers to a resolution at a state level, examples disclosed herein are not limited thereto. Geographic resolutions of interest may be analyzed at any level, such as a city level within a state of interest, a regional level representing several states of interest, a country level, etc. For instance, a server farm in Jacksonville, Fla., a server farm in St. Augustine, Fla., a server farm in Gainesville, Fla. etc, can be used to study markets dispersed throughout Florida. In some examples, the market researcher invests capital in the form of computer equipment to initiate the probes, rental and/or building costs to house the computer equipment, and/or personnel costs to maintain the computer equipment in proper working order. In some examples, the market researcher employs proxy services having a per-probe fee rather than expend the capital necessary to facilitate probes in one or more desired geographies of interest. One example proxy service is GeoSurf™, which owns and operates proxy locations throughout the world, and offers access to such proxy locations for a fee. In either case, as the number of requested probes increases, so does the cost of probing efforts.

Figure 1:
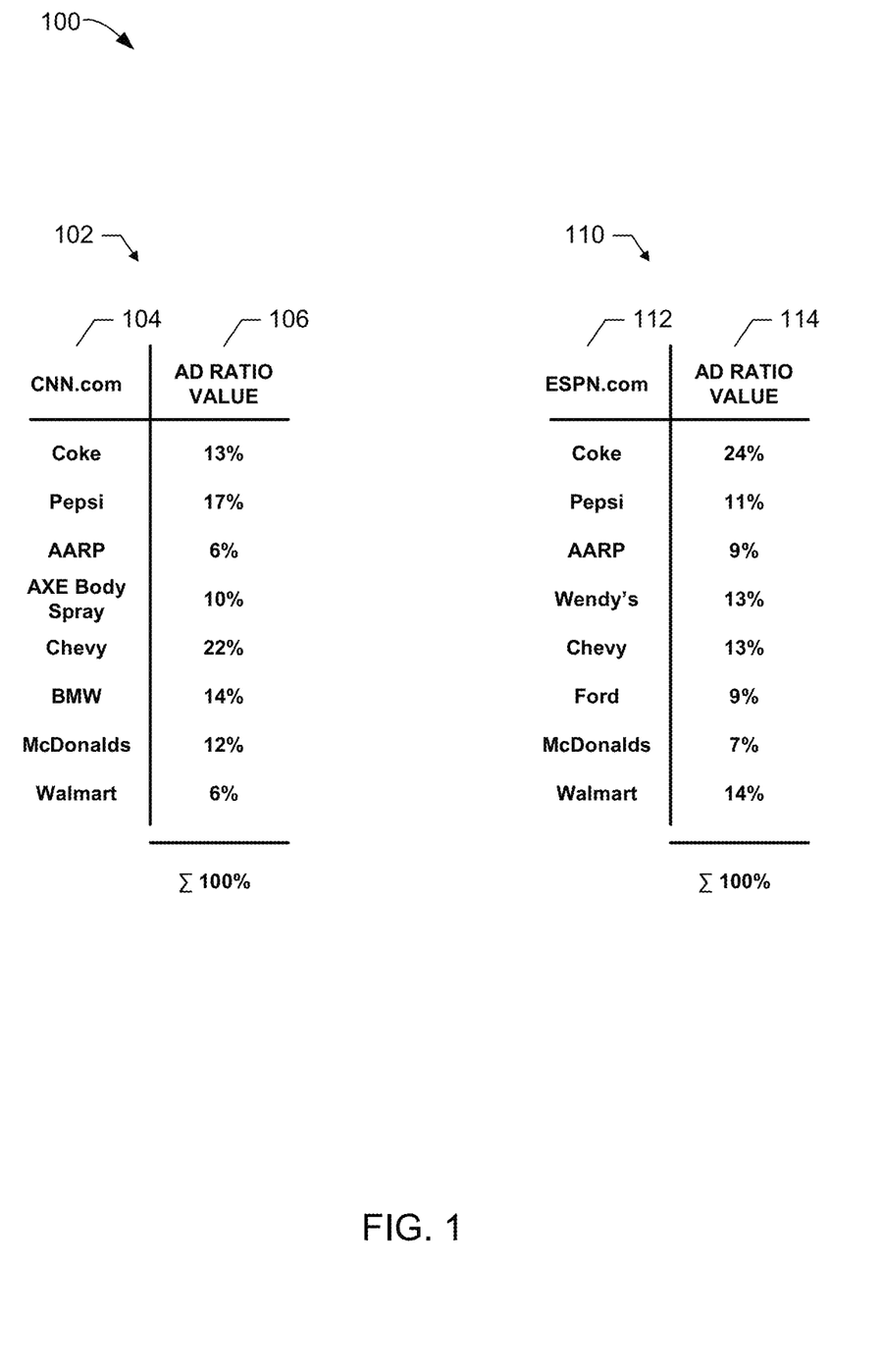
FIG. 1 are example tables illustrating baseline advertising ratios for Internet publishers.

Example methods, apparatus, systems and/or articles of manufacture disclosed herein identify skew values for Internet publishers so that a probing rate may be established in proportion to the advertising diversity of the Internet publisher and/or the advertising diversity of the Internet publisher for a particular geographic region of interest. FIG. 1 are example tables illustrating baseline advertising ratios (ad ratios) 100 for a first Internet publisher and a second Internet publisher of interest. As described in the example above, the baseline ad ratio reflects a proportionate amount of advertising for each of two advertisers that purchases ad space for the Internet publisher. Thus, the baseline ad ratio reflects all advertising purchased by the two advertisers as a percentage metric that is independent of geography, and is sometimes referred to as total advertising.

In the illustrated example of FIG. 1, a first Internet publisher baseline table 102 is associated with cnn.com and includes an advertiser column 104 and an ad ratio column 106. Because the first Internet publisher baseline table 102 reflects all advertising for cnn.com, the corresponding ad ratio values for each of the advertisers accumulate to 100%. A second Internet publisher baseline table 110 in the illustrated example of FIG. 1 is for espn.com and includes an advertiser column 112 and an ad ratio column 114. As described above, because the second Internet publisher baseline table 110 reflects all advertising for espn.com, the corresponding ad ratio values for each of the advertisers accumulate to 100%. While the illustrated example of FIG. 1 includes a first Internet publisher baseline table 102 and a second Internet publisher baseline table 110, examples disclosed herein may include any number of Internet publisher baseline tables.

In some examples, each Internet publisher baseline table of interest may be established and/or otherwise determined in response to proxy probing efforts in geographies of interest for an analysis period of interest. For example, probing of the website cnn.com from proxies at each geography of interest may be initiated for a 24-hour period to capture a list of all advertisers that utilize ad space from cnn.com. Additionally, probing of the website espn.com from the same proxies at each geography of interest may be initiated for a 24-hour period to capture a list of all advertisers that utilize ad space from espn.com. During the example time period of probing (e.g., 24-hour period, 2-day period, 1-week period, etc.), the proxies may be instructed to perform a probe once every minute, once every five-minutes, or at any other probing frequency desired to capture the baseline ad ratios for each of the Internet publishers of interest.

However, while initial probing efforts are applied to establish the baseline ad ratios and establish a thorough list of advertisers, subsequent probing efforts may be adjusted to occur at an alternate (e.g., lower) frequency depending on advertising diversity occurring with respect to one or more particular geographies of interest. As described above, probing efforts include an associated cost per probe. Example methods, apparatus, systems and/or articles of manufacture disclosed herein allow determination of a probing frequency which is proportionate to a corresponding advertising diversity for respective geographies of interest, thereby saving expenditures of computing resources, reducing network bandwidth usage, and/or reducing costs for market research efforts. In some examples, probing efforts may be thwarted by one or more websites that track probing frequencies. For instance, in the event a website notices a threshold number of probes to its website, then one or more blocking efforts may be established by that website to prevent further probing efforts to operate. In other words, an Internet protocol (IP) address associated with a request to the website may be blocked, thereby preventing the request from returning and/or otherwise rendering the content of the probed website. In some examples, the website may interpret relatively heavy probing efforts as excessive bot behavior (e.g., robots rather than human activity), and identify the corresponding IP address and/or user agent information for blocking purposes.

Figure 2:
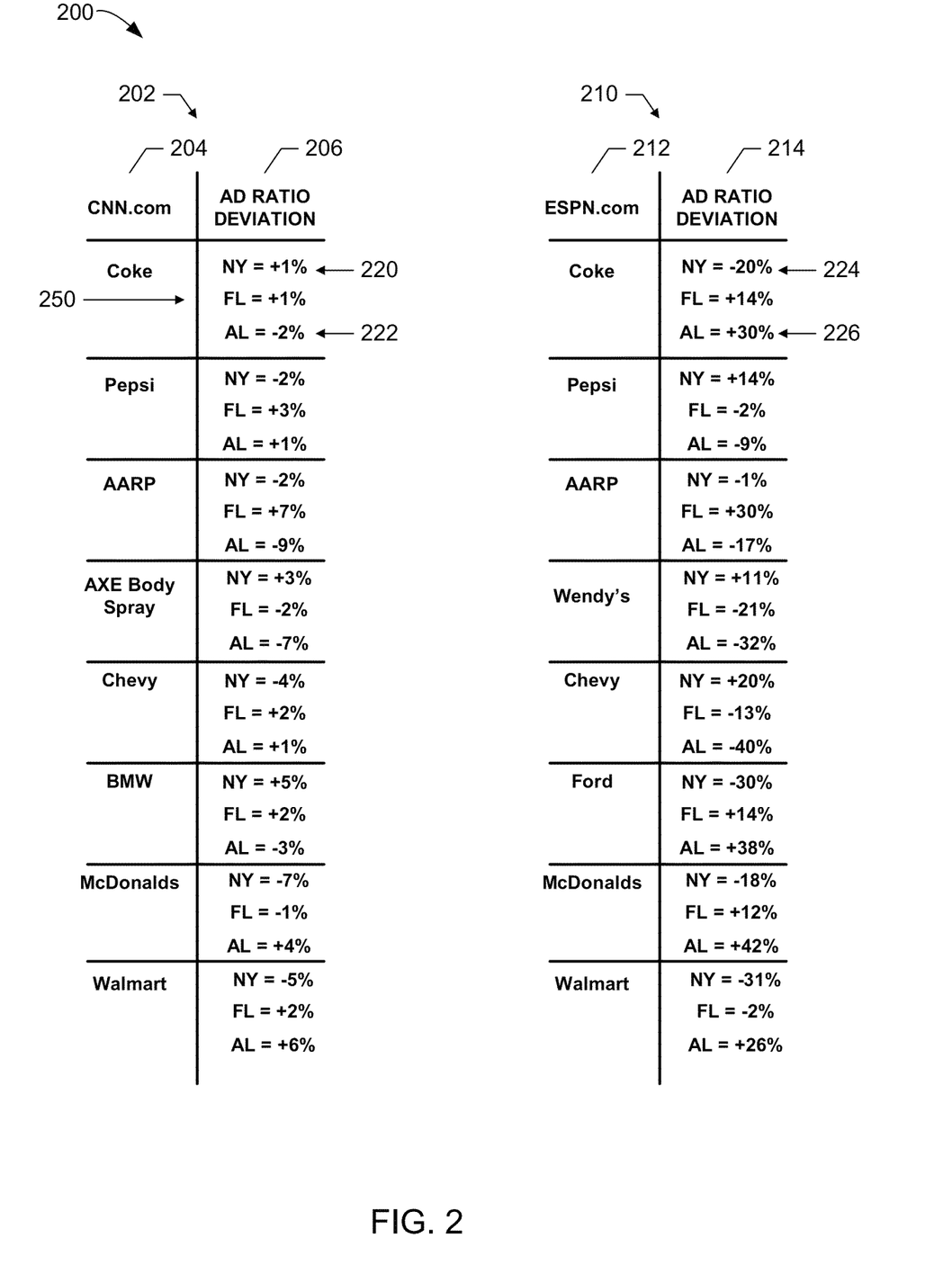
FIG. 2 are example tables illustrating general skew of the example Internet publishers of FIG. 1 to identify a quantity of advertising ratio deviation in geographies of interest.

FIG. 2 are two example general skew tables 200 to indicate how these different geographies of interest differ from the example baseline ratios of FIG. 1. In the illustrated example of FIG. 2, a first general skew table 202 is associated with the Internet publisher cnn.com and includes an advertiser column 204 and an ad ratio deviation column 206. The advertisers listed in the example advertiser column 204 are the same advertisers that were involved in the baseline ad ratio probing effort, as shown in column 104 of FIG. 1. The ad ratio deviation values in the example ad ratio deviation column 206 correspond to respective ones of the geographies of interest for the corresponding advertisement. While the illustrated example of FIG. 2 includes three example geographies of interest (i.e., New York (N.Y.), Florida (FL) and Alabama (AL)), any number of geographies and/or regions of interest may be applied in the examples disclosed herein. The illustrated example of FIG. 2 also includes a second general skew table 210 associated with the Internet publisher espn.com and includes an advertiser column 212 and an ad ratio deviation column 214. The two tables 202, 210 of FIG. 2 are similar in format, but reference different Internet publishers. Thus, the above discussion of the first table 202 applies analogously to the second table 210.

In the illustrated example of FIG. 2, the ad ratio deviations reflect an amount (e.g., a percentage) of change in advertising presence for the respective geography of interest when compared with the corresponding baseline ad ratio of FIG. 1, in which the baseline ad ratio is sometimes referred to herein as the general skew. For example, an ad ratio deviation for cnn.com for the advertiser Coke is 1% higher in New York (220) than for the baseline ad ratio (see FIG. 1, where the Coke baseline ad ratio is 13%), but an ad ratio deviation for cnn.com for the same advertiser is 2% lower in Alabama (222). In another example, an ad ratio deviation for espn.com for the advertiser Coke is 20% lower in New York (224) than for the baseline ad ratio (see FIG. 1, where the Coke baseline ad ratio is 24% for espn.com). An ad ratio deviation for espn.com for the same advertiser (Coke) is 30% higher in Alabama (226).

The general skew provides an indication of how much advertising diversity occurs for each Internet publisher of interest with respect to a particular advertiser in a particular geography. For instance, the advertiser Coke exhibits relatively low ad ratio deviation values from different geographies when advertising with the Internet publisher cnn.com when compared with advertising with the Internet publisher espn.com. In other words, the relative magnitudes of the ad ratio deviations for Coke between New York, Florida and Alabama differ by three percentage points when advertising with cnn.com (AL=−2%, NY=+1%, FL=+1%), but the relative magnitudes of the ad ratio deviations for Coke between those same geographies differ by fifty percentage points when advertising with espn.com (AL=+30%, NY=−20%, FL=+14%). Such differences in standard deviation reflect a relatively greater degree of advertising diversity between geographies of interest for espn.com than for cnn.com.

Based on the advertising diversity identified for the Internet publisher cnn.com, a proportional probing frequency is established for cnn.com. Merely causing proxy resources to conduct probing at a default probing frequency for all Internet publishers of interest would cause a waste of resources (e.g., extra bandwidth usage, extra inventory storage usage, extra processor cycle usage, etc.) for some Internet publishers having a relatively low advertising diversity if such default probing frequency is set too high. Conversely, if the default probing frequency were set too low, it would cause an insufficient analysis of Internet publishers having a relatively higher advertising diversity. To overcome these problems, example methods, apparatus, systems and/or articles of manufacture disclosed herein establish and/or otherwise determine a probing frequency of a given Internet publisher based on observed advertising diversity behavior of that particular Internet publisher. Moreover, such probing frequency may be set to different values in geographies of interest based on the observed advertising diversity behavior.

Figure 3:
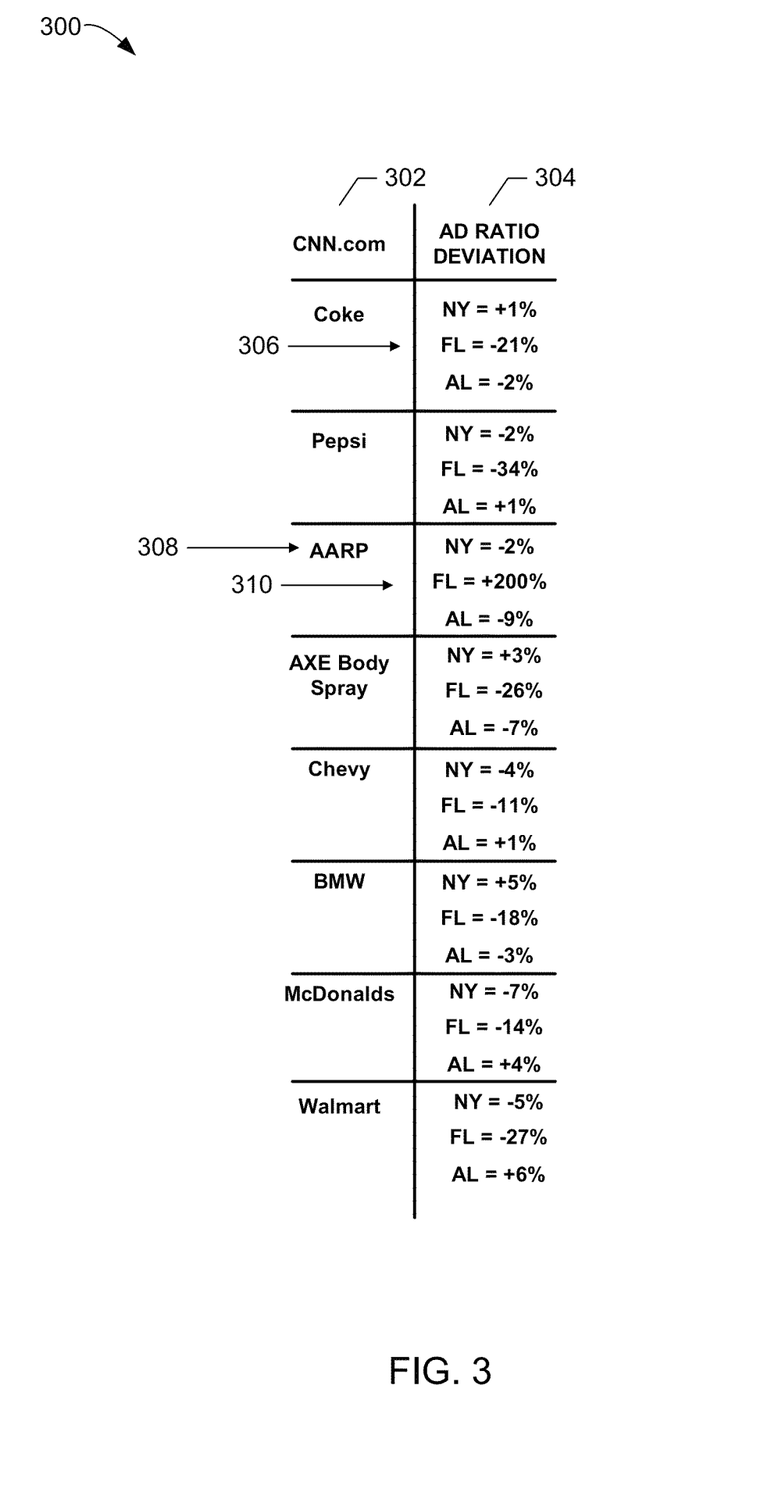
FIG. 3 is an example table illustrating special skew associated with one of the Internet publishers of FIGS. 1 and 2.

As described above, an Internet publisher that exhibits a relatively low amount of advertising diversity (skew) may, for various reasons, exhibit greater amounts of skew at a different time. In such example circumstances, a corresponding probing frequency may need to change to adequately capture the advertising behavior of the Internet publisher of interest. FIG. 3 is an example subsequent skew table 300 calculated at a subsequent time from when the first general skew table 202 of FIG. 2 was calculated for the Internet publisher cnn.com. In the illustrated example of FIG. 3, the subsequent skew table 300 includes an advertiser column 302 and an ad ratio deviation column 304 similar to the table format shown in FIG. 2. The example subsequent skew table 300 reveals that ad ratio deviation values for the example geographies of New York and Alabama do not differ substantially from the baseline ad ratios identified in the illustrated example of FIG. 1. In particular, the example ad ratio deviation values for the example geographies of New York and Alabama are the same as those identified in the previous analysis shown in FIG. 2, and only deviate from the baseline ad ratios by −9% at the lowest, and by +6% at the highest. In some examples, the deviation of ad ratio values from different geographies of interest may be identified based on a standard deviation value therebetween.

In the illustrated example of FIG. 3, the Florida geography now exhibits an ad ratio deviation (306) having a higher value than what was previously observed in the illustrated example of FIG. 2. In particular, for the Internet publisher cnn.com, the ad ratio deviation associated with Coke advertisements are 21% lower than the baseline ad ratio of 13%, which is a change of twenty-two percentage points (22%) when compared to the general skew calculation (250) of FIG. 2. In some examples, special skew may be identified and/or otherwise categorized based on a threshold deviation value from a previous skew calculation. In still other examples, special skew may be identified and/or otherwise categorized based on a threshold standard deviation from the baseline ad ratio value(s) (see FIG. 1). In some examples, sourcing effects may be identified by comparing directional magnitudes of ad ratio deviation values from two or more geographies of interest. For instance, the ad ratio deviation in the example subsequent skew table 300 of FIG. 3 associated with AARP advertisements 308 in Florida 310 is +210%, and the ad ratio deviation in that same geography of interest (i.e., Florida) for all other advertisers is negative (i.e., Coke=−21%, Pepsi=−34%, AXE Body Spray=−26%, Chevy=−11%, BMW=−18%, McDonalds=−14% and Walmart=−27%). In other words, the advertiser AARP focused a relatively substantial advertising effort in Florida that would have otherwise been available to other advertisers, thereby essentially depriving the other advertisers from the opportunity of advertising with cnn.com.

In the illustrated example of FIG. 3, one or more ad ratio deviation threshold values may be identified to reveal an occurrence of special skew. For example, in the event an ad ratio deviation magnitude in excess of 50% is identified, then the geography of interest may be considered to exhibit special skew behavior. Using an example ad ratio deviation threshold of 50%, the example geography of Florida 310 is identified as exhibiting special skew because its corresponding ad ratio deviation value is +200% (i.e., greater than the threshold of 50%). After one or more instances of special skew is identified, example methods, apparatus, systems and/or articles of manufacture disclosed herein respond by modifying and/or otherwise re-evaluating probing frequency efforts associated with the affected geography of interest. As described above, probing efforts may be adjusted to reduce (e.g., minimize) wasted probing efforts for geographic regions of interest that do not exhibit at least a particular value of ad ratio deviation (e.g., expressed as a percentage value). When probing instances occur for a particular geography of interest that does not exhibit a sufficient ad ratio deviation, then computing resources (e.g., processor cycles, bandwidth usage, etc.) are wasted on such probing efforts that could otherwise be directed to other uses (e.g., one or more alternate geographies of interest that exhibit relatively greater amounts of ad ratio deviation).

Figure 4:
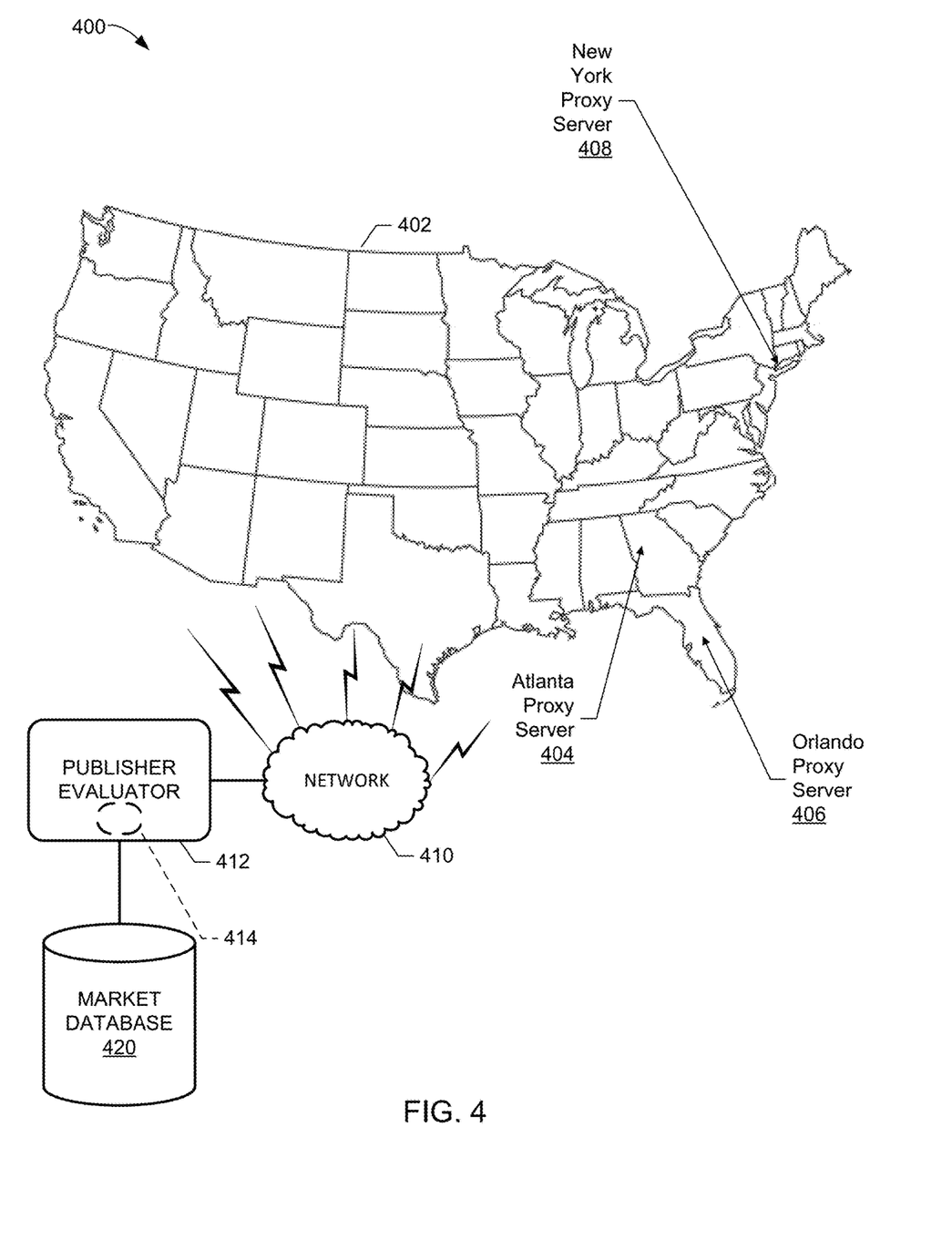
FIG. 4 is a schematic illustration of an example market evaluation system to identify publisher advertising behavior.

FIG. 4 is a schematic illustration of an example market evaluation environment 400. In the case of FIG. 4, the United States of America is identified as an analysis geography 402. In the illustrated example of FIG. 4, the analysis geography 402 includes any number of geographies of interest, such as one or more region(s) of interest (e.g., Southeast, Northeast, Pacific Northwest, etc.), one or more state(s) of interest (e.g., New York, Florida, Alabama), one or more counties of interest, and/or one or more cities of interest. In response to an Internet probe, an Internet browser located in a geography of interest sends an HTTP request to a web address of interest (e.g., a uniform resource locator (URL)) for an Internet publisher of interest (e.g., CNN via http://cnn.com, ESPN via www.espn.com, etc.). Publisher advertising behavior may occur via any appropriate type of distribution system and/or network and may use any type of media such as audio, still image, moving image and/or combinations thereof presented and/or capable of being presented to an audience. In some examples, Internet media that occupies ad space purchased by an advertiser includes a still image banner advertisement having text and/or images, moving images (e.g., portions of movies, television shows, newscasts, etc.) and/or images accompanied by audio. The publisher advertising behavior is captured to allow market research analysis, such as identifying particular advertisers, identifying particular advertisement media types, identifying variation in which advertisers occupy the purchased ad space at which periods of time (e.g., coffee advertiser activity during morning hours, television broadcaster advertiser activity during late afternoon hours, etc.).

As described above, the example Internet browser located in the geography of interest may be executed on a computing device (e.g., a server, a personal computer, a server farm, etc.) that is physically located in or near the geography of interest. In the illustrated example of FIG. 4, the computing devices are implemented by proxy servers. In this example, three proxy servers are shown; an Atlanta proxy server 404, an Orlando proxy server 406 and a New York proxy server 408. An Internet probe performed by the example Atlanta proxy server 404 results in the Internet browser (e.g., an Internet browser executed by the Atlanta proxy server 404) navigating to the Internet publisher of interest (e.g., CNN via http://cnn.com) and capturing data (e.g., screen shots, optical character recognition, etc.) associated with ad space presented on the Internet publisher of interest at that time. Generally speaking, each geography of interest may exhibit ad space usage associated with global/national brands (e.g., nationally recognized financial institutions, airlines, soft drinks, etc.) and/or regional or local brands that are marketed in a relatively smaller geography (e.g., regionally known grocery store chains, local car dealerships, local restaurants, etc.). On the other hand, an Internet probe performed by the example Orlando proxy server 406 results in the Internet browser navigating to the same publisher of interest and capturing data associated with ad space presented via that same Internet publisher of interest and/or a supporting ad server. Although the same Internet publisher of interest (e.g., CNN via http://cnn.com) may be probed from both the example Atlanta proxy server 404 and the example Orlando proxy server 406, different advertisements (e.g., representing different brands and/or advertisements) may be presented in the associated ad space as seen by the Atlanta server 404 as compared to the advertising seen by the Orlando server 406. For example, the ad space of the Internet publisher in the state of Florida may include advertisements associated with the Jacksonville Jaguars, while the ad space of that same Internet publisher in the state of Georgia may include advertisements associated with the Atlanta Falcons. Of course, ad space for any particular Internet publisher may be utilized by any type of advertiser that secures rights to the ad space based on, for example, bidding a relative highest amount of money for the ad space. As such, an advertiser associated with a branded beverage (e.g., Coke®) may outbid an advertiser in Georgia associated with the Atlanta Falcons.

While three example proxy servers are shown in the illustrated example of FIG. 4, such examples are for illustrative purposes and not limitation. Any number of proxy servers may be considered and/or otherwise operate in a market evaluation environment, such as the illustrated market evaluation environment 400 of FIG. 4. In some examples, the proxy servers are owned and operated by the market researcher, which requires investment costs for proxy servers (e.g., computing devices), costs for housing the proxy servers (e.g., lease property, rent property, electrical power costs, thermal management, etc.) and/or costs to maintain the proxy servers (e.g., Information Technology personnel). In some examples, the proxy servers are not owned and operated by the market researcher, but are instead invoked on a per-probe fee structure facilitated by a third party (e.g., GeoSurf™). In either case, conducting one or more probes of Internet publishers of interest includes one or more associated financial costs and multiple costs in terms of computing resources (e.g., bandwidth, processor cycles, and/or memory).

The example Atlanta proxy server 404, the example Orlando proxy server 406, the example New York proxy server 408 and/or any other proxy servers that may operate in the example market evaluation environment 400 are communicatively connected to the Internet, symbolically represented as a network cloud 410 in FIG. 4. In the example of FIG. 4, a publisher evaluator 412 is communicatively connected to the example network 410 to cause computing resources (e.g., the proxy server(s) 404, 406, 408) to identify publisher advertising behavior. After probing one or more Internet publishers of interest, the probing computing resource returns the advertising data and is given to the example publisher evaluator 412. The example publisher evaluator 412 stores acquired advertising data associated with ad space content in a memory (e.g., a market database 420). To establish and/or modify probing rates for one or more geographies of interest, an example probe manager 414 is invoked by the example publisher evaluator 412.

Figure 5:
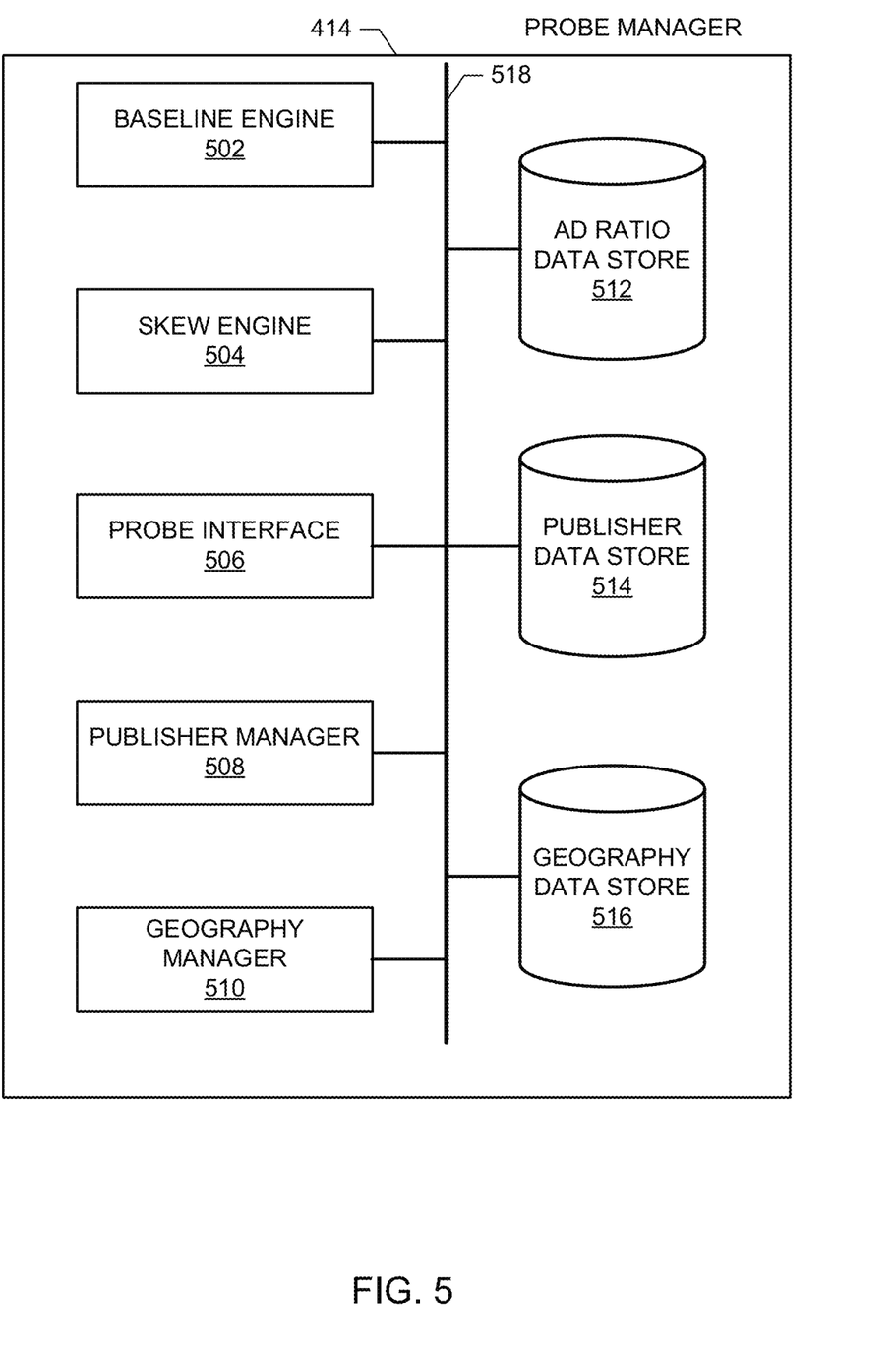
FIG. 5 is a schematic illustration of an example implementation of the probe manager of FIG. 4 to identify publisher advertising behavior.

FIG. 5 is a schematic illustration of an example implementation of the example probe manager 414 of FIG. 4. The example probe manager 414 identifies publisher advertising behavior and regulates Internet publisher probing rates by the different probing resources distributed at the geography of interest. In the illustrated example of FIG. 5, the probe manager 414 includes a baseline engine 502, a skew engine 504, a probe interface 506, a publisher manager 508, a geography manager 510, an ad ratio data store 512, a publisher data store 514, a geography data store 516, and a control bus 518 to facilitate communication within the example probe manager 414. In operation, the example baseline engine 502 determines whether baseline ad ratio values have been acquired and/or otherwise calculated for each Internet publisher of interest, as described above in view of the example tables of baseline ad ratios 100 of FIG. 1. In the event baseline ad ratio values have not been acquired and/or otherwise calculated for each Internet publisher of interest (e.g., a new provider is added, a new geography of interest is added, a new website for a new or existing publisher is added, etc.), the example probe interface 506 initiates probes to establish a baseline ad ratio value for each Internet publisher of interest in each geography of interest.

In some examples, the publisher manager 508 maintains a list of Internet publishers of interest to the market researcher and provides corresponding web address information to the example probe interface 506 to be used during one or more probing instances. Additionally, the example geography manager 510 maintains a list of geographies of interest to the market researcher and provides geography information to the example probe interface 506 so that the geographically specific probing server can be identified when navigating to the web address associated with the Internet publisher of interest. For example, in the event the Internet publisher "CNN" is to be probed in and/or near the state of Georgia, then the publisher manager 508 forwards the web address http://cnn.com to the example probe interface 506 and the example geography manager 510 associates the web address http://cnn.com with the example Atlanta proxy server 404 to identify which computing equipment is to conduct the probe. The probe interface 506 then sends a probing instruction to the geographic probing devices (e.g., the Atlanta server). As described above in connection with FIG. 1, the baseline ad ratio values (106, 114) are agnostic to geography and, instead, reflect an aggregate consumption of ad space per advertiser for all geographies of interest.

While the baseline ad ratio values indicate a relative quantity of advertising presence for each advertiser of interest on each particular Internet publisher of interest in each geography of interest, a general skew ad ratio calculated by the example skew engine 504 indicates an amount of deviation from the baseline values on a per-geography basis, as described above in connection with FIG. 2. In some examples, a particular geography of interest exhibits, for a particular Internet publisher, a relatively greater or lesser advertising focus for a brand when compared to the baseline ad ratio values. For instance, as described above in connection with FIG. 2, the example brand Coke exhibits, for the Internet publisher CNN, an ad ratio deviation of +1% in New York, but exhibits an ad ratio deviation of −2% in Alabama. In other words, Coke advertisements are run in the geography of New York at a rate slightly greater than the baseline focus, while Coke advertisements are run in the geography of Alabama at a rate slightly less than the baseline focus. As a result, a corresponding probing rate may be respectively established by the example probe interface 506 based on a particular magnitude ad ratio deviation for each geography of interest. For instance, a separate Internet publisher of interest, such as ESPN, exhibits ad ratio deviation values for the same brand Coke in the geographies of New York and Alabama (i.e., New York=−20% and Alabama=+30%). Generally speaking, the ad ratio deviation value of −20% in New York reflects a much lower interest and/or advertising focus of the Coke brand for visitors of the ESPN web site, while the ad ratio deviation value of +30% in Alabama reflects a much higher interest and/or advertising focus of the Coke brand for visitors of the ESPN web site.

To illustrate an example manner of establishing a respective probing rate for (a) an Internet publisher of interest within (b) a geography of interest, assume that a first probing rate of ten probes per hour is to occur for a first threshold of ad ratio deviation values, and a second probing rate of twenty probes per hour is to occur for a second threshold of ad ratio deviation values. Also assume that the first threshold of ad ratio deviation values is satisfied within a range of 10 percentage points, and the second threshold of ad ratio deviation values is satisfied within a range of 20 percentage points. Using the example general skew values for the Internet publisher CNN from FIG. 2, the example skew engine 504 determines that all of the ad ratio deviation values have a magnitude of nine (9) percentage points or lower, thereby causing the example probe interface 506 to establish the first probing rate of ten probes per hour for every geography of interest for CNN. In other words, because the general skew is relatively low, a corresponding probing rate may be set to a lower value and/or otherwise select probing resources that are relatively less expensive (e.g., probing resources managed by a market research entity versus probing resources that operate on a pay-per-probe basis). On the other hand, using the example general skew values for the Internet publisher ESPN from FIG. 2, the example skew engine 504 determines that every geography of interest has at least one occurrence of an ad ratio deviation value that is greater than 20 percentage points, thereby causing the example probe interface 506 to establish a second probing rate (different from the first probing rate) for those geographies of interest for ESPN.com. In other words, because the Internet publisher ESPN exhibits a relatively greater degree of ad ratio deviation than exhibited by CNN, a corresponding higher probing rate for ESPN is justified in an effort to accurately capture the advertising behavior of ESPN's ad space. On the other hand, because CNN does not exhibit a relatively high ad ratio deviation, computing resources associated with probing efforts of CNN can be saved (e.g., repurposed) by establishing a relatively lower probing rate.

While the illustrated example above reflects the Internet publisher CNN as having a relatively low ad ratio deviation, thereby justifying the relatively lower first probing rate, the ad ratio deviation may change at a later time. For example, one of the advertisers may decide to inject a substantially large amount of advertising dollars in a particular geography of interest. In some examples, ad space is brokered via one or more bidding processes to allow an advertiser with the highest bid to occupy and/or otherwise populate the ad space of the Internet publisher. In such example cases, the highest bidding advertiser may increase their advertising presence in that geography of interest at the expense of other advertisers that submitted lower bidding values. In other words, relatively higher bidding advertisers source advertising presence from the relatively lower bidding advertisers.

The example skew engine 504 may repeat one or more skew calculations on a periodic, aperiodic, scheduled and/or manual basis to determine whether special skew conditions are present. As described above, special skew may be identified by identifying a threshold amount of deviation (e.g., a percentage value) in advertising behavior from the baseline ad ratio value(s). In the event the skew calculation by the example skew engine 504 results in ad ratio deviation values exceeding the threshold value, the example probe interface 506 may adjust the probing frequency of the probing computing resources for the affected geographies of interest that exhibited more than the threshold change.

While an example manner of implementing the probe manager 414 of FIG. 5 is illustrated in FIGS. 1-4, one or more of the elements, processes and/or devices illustrated in FIGS. 4 and 5 may be combined, divided, re-arranged, omitted, eliminated and/or implemented in any other way. Further, the example baseline engine 502, the example skew engine 504, the example probe interface 506, the example publisher manager 508, the example geography manager 510, the example ad ratio data store 512, the example publisher data store 514, the example geography data store 516 and/or, more generally, the example probe manager 414 of FIGS. 4 and 5 may be implemented by hardware, software, firmware and/or any combination of hardware, software and/or firmware. Thus, for example, any of the example baseline engine 502, the example skew engine 504, the example probe interface 506, the example publisher manager 508, the example geography manager 510, the example ad ratio data store 512, the example publisher data store 514, the example geography data store 516 and/or, more generally, the example probe manager 414 of FIGS. 4 and 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example baseline engine 502, the example skew engine 504, the example probe interface 506, the example publisher manager 508, the example geography manager 510, the example ad ratio data store 512, the example publisher data store 514, the example geography data store 516 and/or, more generally, the example probe manager 414 of FIGS. 4 and 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example probe manager 414 of FIGS. 4 and 5 may include one or more elements, processes and/or devices in addition to, or instead of, those illustrated in FIG. 5, and/or may include more than one of any or all of the illustrated elements, processes and devices.

Figure 6:
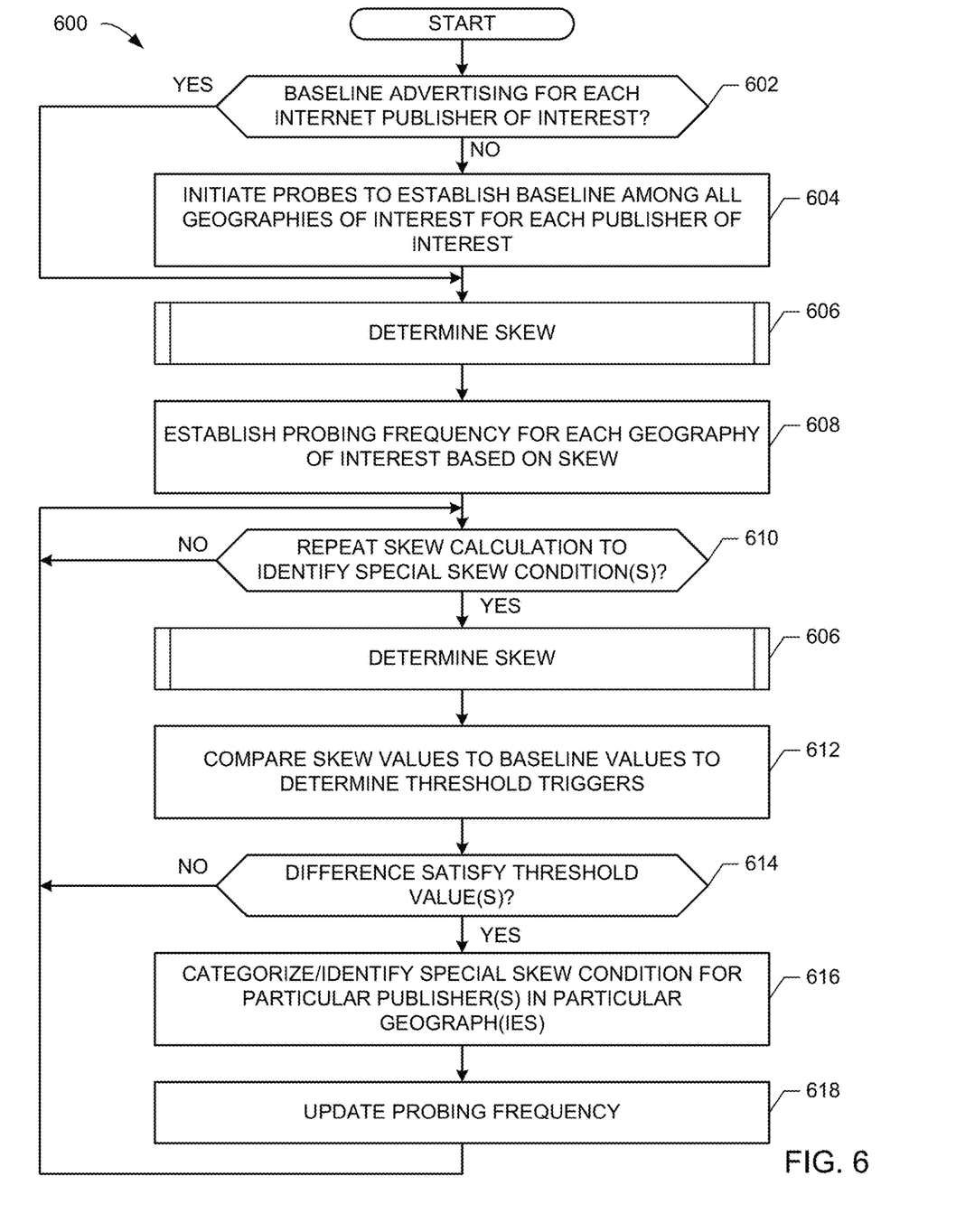
FIGS. 6 and 7 are flowcharts representative of example machine readable instructions that may be executed to implement the example market evaluation system and/or the example probe manager of FIGS. 4 and 5.
Figure 7:
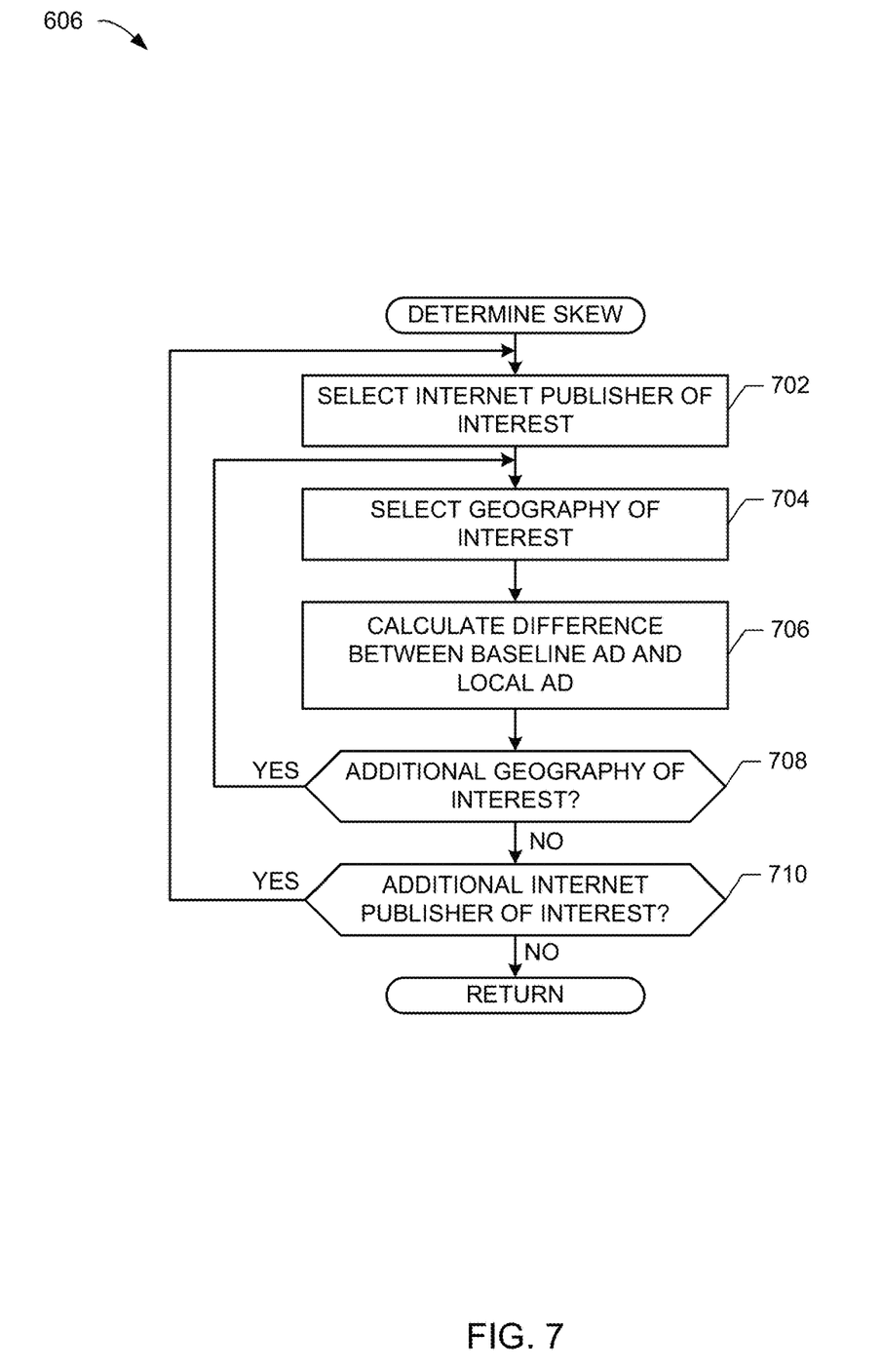

Flowcharts representative of example machine readable instructions for implementing the probe manager 414 of FIGS. 4 and 5 are shown in FIGS. 6-7. In these examples, the machine readable instructions comprise programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 6-7, many other methods of implementing the example probe manager 414 may alternatively be used. For example, the order of execution of the blocks may be changed, and/or some of the blocks described may be changed, eliminated, or combined.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 600 of FIG. 6 begins at block 602 where the example baseline engine 502 determines whether baseline advertising information for each Internet publisher of interest has been established. As described above in connection with FIG. 1, example baseline advertising information may include baseline ad ratios 106, 114 for each advertiser that consumes ad space from any number of Internet publishers of interest. If no baseline advertising information has been established (block 602), the example probe interface 506 initiates probes to establish and/or otherwise acquire baseline information among all geographies of interest for each publisher of interest (block 604). In some examples, the probe interface 506 performs an initial probing effort in all geographies of interest with an initial probing frequency designed to capture a thorough baseline ad ratio for every advertiser of interest. In other words, the initial probing effort probing frequency may be a relatively expensive effort by the market researcher because a relatively greater number of per-probe fees may be incurred if a third party probe service is employed. Ad ratio values returned from the example initial probing effort reflect a percentage amount of advertising presence for a particular advertiser with the Internet publisher of interest for all geographies of interest. As described in further detail below, the example skew engine 504 determines a skew metric for each publisher of interest within each geography of interest to establish ad ratio deviation values (block 606).

FIG. 7 illustrates an example implementation of a process for determining skew (block 606) of FIG. 6. In the illustrated example of FIG. 7, the publisher manager 508 selects an Internet publisher of interest (block 702). In some examples, the publisher manager 508 queries the example publisher data store 514 to identify a list of Internet publishers of interest that are to be evaluated for their respective ad space activity. The example geography manager 510 selects a geography of interest (block 704), which may be selected from a list of any number of geographies of interest stored in the example geography data store 516. Using the selected Internet publisher of interest and the selected geography of interest, the example skew engine 504 calculates a difference between the baseline ad ratio (e.g., see FIG. 1) and the localized ad ratio value (block 706). This difference is referred to as the ad ratio deviation, and is stored in the example ad ratio data store 512.

In the event the example geography manager 510 identifies another geography of interest (e.g., via a query to the example geography data store 516) (block 708), control returns to block 704 to select the next geography of interest for the currently selected Internet publisher of interest. On the other hand, if all geographies of interest for the selected Internet publisher of interest have performed respective ad ratio deviation calculations (block 706), then the example publisher manager 508 determines whether one or more additional Internet publishers of interest are to be evaluated (block 710). If so, control returns to block 702 to select the next Internet publisher of interest.

In some examples, a nominal value of skew is referred to as a general skew that is indicative of an overall amount of variation of advertising across all geographies of interest, while one or more geographies that deviate from a baseline skew value is referred to as a special skew. Returning to FIG. 6, the example probe interface 506 compares the calculated ad ratio deviation values to one or more threshold values to establish a probing frequency for each geography of interest (block 608). In some examples, the probing frequency for a particular geography of interest will be established, calculated and/or otherwise configured to a value less than the frequency employed during the initial probing effort, thereby saving the market researcher costs associated with probing frequency. However, in some examples, the target probing frequency for a particular geography of interest will be established to a value equal to or greater than the frequency employed during the initial probing effort when values of ad ratio deviation are determined to be relatively high and/or exceed/satisfy one or more threshold values. Such threshold values may indicate and/or otherwise suggest that a relatively high amount of different advertising activity is occurring in the ad space of the Internet publisher of interest, thereby justifying the relatively higher rates of probing frequency. As described above, while a geography of interest may exhibit a particular ad ratio deviation at a first time to justify a particular probing frequency, one or more factors may cause that geography of interest to exhibit a change in the ad ratio deviation value(s). For example, a particular advertiser may identify that a particular geography of interest should receive a barrage of advertisements related to a new product to be released, a new movie to be released, a political candidate advertisement for a localized and/or national election, or any other change in advertising behavior.

The example skew engine 504 may determine whether to repeat a skew calculation to identify one or more instances of special skew on a periodic, aperiodic, scheduled and/or manual basis (block 610). If so, the example skew engine 504 is again invoked to determine skew values for each geography of interest (block 606), and compares the newly calculated ad ratio deviation values to threshold values to determine whether one or more conditions of special skew is present (block 612). In some examples, the skew engine 504 compares the newly calculated ad ratio deviation values to previously calculated ad ratio deviation values to identify localized changes in advertising behavior.

If the difference between the newly calculated ad ratio deviation values for one or more geographies of interest does not satisfy (e.g., exceed) one or more threshold values (block 614), then control returns to block 610 to await another opportunity to check for instances of special skew. On the other hand, if the difference between the newly calculated ad ratio deviation values for one or more geographies of interest satisfies (e.g., exceeds by a threshold amount, falls short by a threshold amount) one or more threshold values (block 614), then the skew engine 504 categorizes the particular Internet publisher and corresponding geography of interest as exhibiting special skew (block 616). Based on which threshold(s) are satisfied, the example probe interface 506 updates a probing frequency for the geograph(ies) of interest (block 618).

Figure 8:
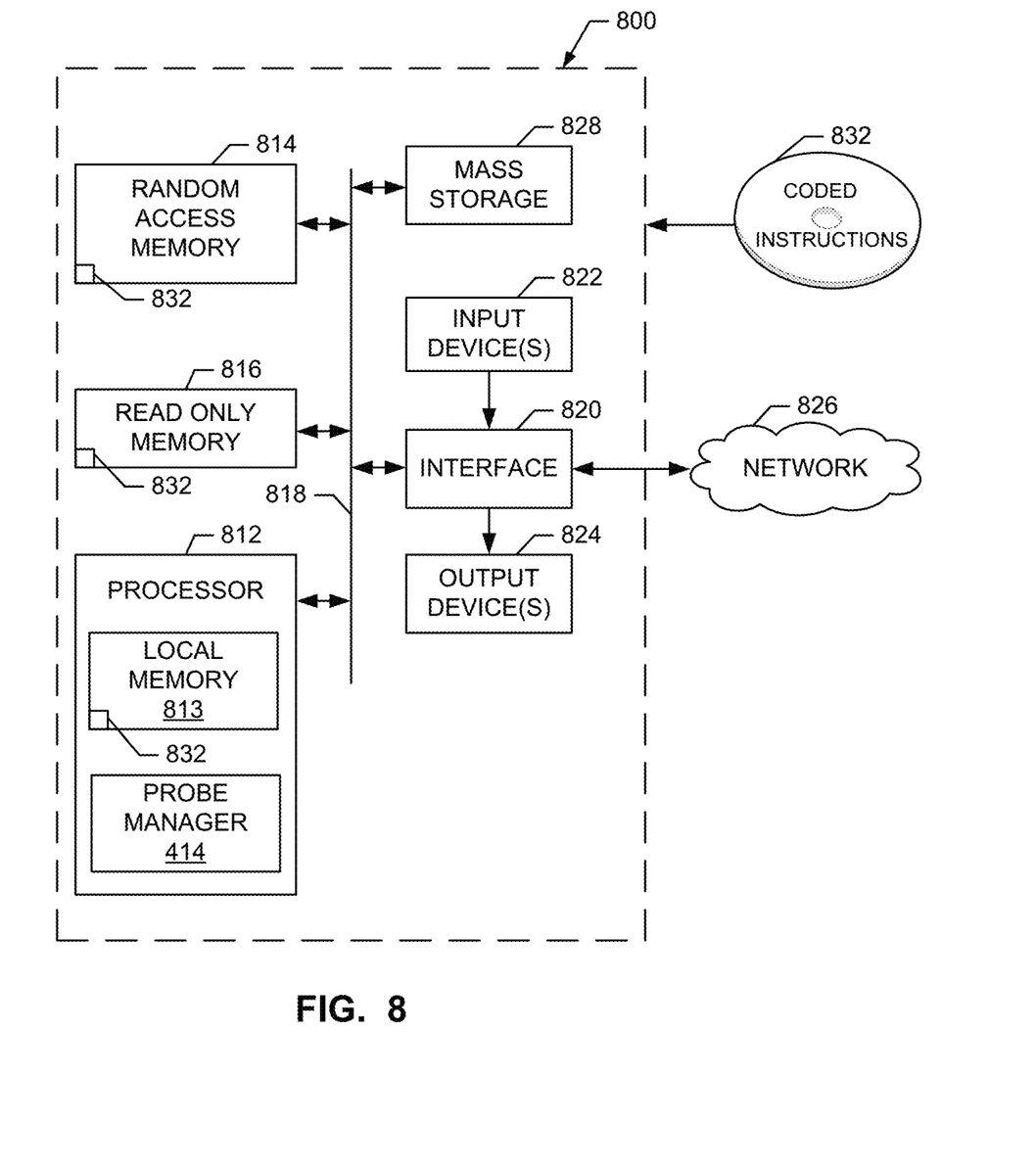
FIG. 8 is a schematic illustration of an example processor platform structured to execute the instructions of FIGS. 6-7 to implement the example market evaluation system and/or probe manager of FIGS. 4 and 5.

FIG. 8 is a block diagram of an example processor platform 800 structured to execute the instructions of FIGS. 6-7 to implement the probe manager 414 of FIGS. 4 and/or 5. The processor platform 800 can be, for example, a server, a personal computer, a mobile device (e.g., a cell phone, a smart phone, a tablet such as an iPad™), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. Additionally, the example processor 812 may include the example probe manager 414, which includes the example baseline engine 502, the example skew engine 504, the example probe interface 506, the example publisher manager 508, the example geography manager 510, the example ad ratio data store 512, the example publisher data store 514, and/or the example geography data store 516.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a microphone, a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5-6 may be stored in the mass storage device 828, in the volatile memory 814, in the non-volatile memory 816, and/or on a removable tangible computer readable storage medium such as a CD or DVD.

From the foregoing, it will be appreciated that example methods, systems, apparatus and/or articles of manufacture to identify publisher advertising behavior have been disclosed to achieve improved server efficiency when gathering information regarding which advertisers are consuming and/or otherwise purchasing ad space from the Internet publishers of interest. In particular, disclosed examples reduce probing by computer networking equipment within one or more networks, including the Internet, by establishing probing rates for the probing equipment in a manner that is proportional to the amount of advertising diversity detected within each geography of interest for each particular Internet publisher of interest. This approach reduces probing and/or reduces unnecessary network traffic. Further, examples disclosed herein saves processor resources by reducing the number of probing events, and reduces memory usage by avoiding unnecessary collection and/or storage of data which is unneeded to show an interesting change in behavior. In still other examples disclosed herein, this approach increases probing efforts when one or more geographies of interest are underrepresented and/or otherwise in need of greater sample frequencies to derive statistically significant results of market behavior.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to probe an Internet publisher, the apparatus comprising:
   a skew engine to determine a first advertising deviation of the Internet publisher based on a difference between a baseline advertising ratio and a local advertising ratio associated with a geography;
   a probe interface to configure a first probing frequency at a network-connected server based on a comparison of the first advertising deviation to a first threshold, the network-connected server associated with the geography, the first probing frequency corresponding to probing efforts for the geography of the Internet publisher; and
   a probe manager to re-configure the first probing frequency at the network-connected server by modifying the first probing frequency to a second probing frequency to manage the probing efforts for the geography in response to a difference between the first advertising deviation and a second advertising deviation of the Internet publisher satisfying a second threshold, the probe interface to transmit an instruction to the network-connected server to cause the network-connected server to perform the probing efforts at the second probing frequency.

2. The apparatus of claim 1, wherein the probe manager is to:
   re-configure the first probing frequency by decreasing the first probing frequency to the second probing frequency to reduce computational probing waste in response to determining an advertising diversity decreased.

3. The apparatus of claim 1, wherein the baseline advertising ratio reflects a quantity of advertising space consumed on a website of the Internet publisher, the quantity of advertising space independent of the geography.

4. The apparatus of claim 1, wherein the geography is a first geography and further including a second geography, wherein the probe interface is to:
obtain data from a first server associated with the first geography; and
obtain data from a second server associated with the second geography, the probe interface to obtain data from the first and second servers via a network.

5. The apparatus of claim 4, wherein the probe interface is to cause at least one of the first server or the second server to navigate to a website of the Internet publisher.

6. The apparatus of claim 1, wherein the probe manager is to modify the first probing frequency to the second probing frequency in response to determining an advertising diversity increased.

7. The apparatus of claim 1, wherein the probe manager is to increase the first probing frequency to the second probing frequency based on a ratio of the first advertising deviation and the second advertising deviation.

8. A tangible machine readable storage medium comprising machine accessible instructions that, when executed, cause a machine to, at least:
determine a first advertising deviation of an Internet publisher based on a difference between a baseline advertising ratio and a local advertising ratio associated with a geography;
configure a first probing frequency at a network-connected server based on a comparison of the first advertising deviation to a first threshold, the network-connected server associated with the geography, the first probing frequency corresponding to a plurality of probing efforts for the geography of the Internet publisher;
re-configure the first probing frequency at the network-connected server by modifying the first probing frequency to a second probing frequency to manage the plurality of probing efforts for the geography in response to a difference between the first advertising deviation and a second advertising deviation of the Internet publisher satisfying a second threshold; and
transmit an instruction to the network-connected server to cause the network-connected server to perform the probing efforts at the second probing frequency.

9. The tangible machine readable storage medium of claim 8, wherein the instructions, when executed, cause the machine to:
re-configure the first probing frequency by decreasing the first probing frequency to the second probing frequency to reduce computational probing waste in response to determining an advertising diversity decreased.

10. The tangible machine readable storage medium of claim 8, wherein the baseline advertising ratio reflects a quantity of advertising space consumed on a website of the Internet publisher, the quantity of advertising space independent of the geography.

11. The tangible machine readable storage medium of claim 8, wherein the geography is a first geography and further including a second geography, wherein the instructions, when executed, case the machine to:
obtain data from a first server associated with the first geography; and
obtain data from a second server associated with the second geography, the machine to obtain data from the first and second servers via a network.

12. The tangible machine readable storage medium of claim 11, wherein the instructions, when executed, cause the machine to initiate instructions to cause at least one of the first server or the second server to navigate to a website of the Internet publisher.

13. The tangible machine readable storage medium of claim 8, wherein the instructions, when executed, cause the machine to modify the first probing frequency to the second probing frequency in response to determining an advertising diversity increased.

14. The tangible machine readable storage medium of claim 8, wherein the instructions, when executed, cause the machine to increase the first probing frequency to the second probing frequency based on a ratio of the first advertising deviation and the second advertising deviation.

15. A system to probe an Internet publisher, the system comprising:
means for determining a first advertising deviation of the Internet publisher based on a difference between a baseline advertising ratio and a local advertising ratio associated with a geography;
means for configuring a first probing frequency at a network-connected server based on a comparison of the first advertising deviation to a first threshold, the network-connected server associated with the geography, the first probing frequency corresponding to probing efforts for the geography of the Internet publisher; and
means for re-configuring the first probing frequency at the network-connected server by modifying the first probing frequency to a second probing frequency to manage the probing efforts for the geography in response to a difference between the first advertising deviation and a second advertising deviation of the Internet publisher satisfying a second threshold, the configuring means to transmit an instruction to the network-connected server to cause the network-connected server to perform the probing efforts at the second probing frequency.

16. The system of claim 15 wherein the re-configuring means is to:
re-configure the first probing frequency by decreasing the first probing frequency to the second probing frequency to reduce computational probing waste in response to determining an advertising diversity decreased.

17. The system of claim 15, wherein the baseline advertising ratio reflects a quantity of advertising space consumed on a website of the Internet publisher, the quantity of advertising space independent of the geography.

18. The system of claim 15, wherein the geography is a first geography and further including a second geography, wherein the configuring means is to:
obtain data from a first server associated with the first geography; and
obtain data from a second server associated with the second geography, the configuring means to obtain data from the first and second servers via a network.

19. The system of claim 18, wherein the configuring means is to cause at least one of the first server or the second server to navigate to a website of the Internet publisher.

20. The system of claim 15, wherein the re-configuring means is to modify the first probing frequency to the second probing frequency in response to determining an advertising diversity increased.

21. The system of claim 15, wherein the re-configuring means is to increase the first probing frequency to the second probing frequency based on a ratio of the first advertising deviation and the second advertising deviation.

22. An apparatus comprising:
memory;
machine readable instructions; and
at least one processor to execute the machine readable instructions to:
determine a first advertising deviation of an Internet publisher based on a difference between a baseline advertising ratio and a local advertising ratio associated with a geography;
configure a first probing frequency at a network-connected server based on a comparison of the first advertising deviation to a first threshold, the network-connected server associated with the geography, the first probing frequency corresponding to probing efforts for the geography of the Internet publisher;
re-configure the first probing frequency at the network-connected server by modifying the first probing frequency to a second probing frequency to manage the probing efforts for the geography in response to a difference between the first advertising deviation and a second advertising deviation of the Internet publisher satisfying a second threshold; and
transmit an instruction to the network-connected server to cause the network-connected server to perform the probing efforts at the second probing frequency.

23. The apparatus of claim 22, wherein the at least one processor is to execute the instructions to:
re-configure the first probing frequency by decreasing the first probing frequency to the second probing frequency to reduce computational probing waste in response to determining an advertising diversity decreased.

24. The apparatus of claim 22, wherein the baseline advertising ratio reflects a quantity of advertising space consumed on a website of the Internet publisher, the quantity of advertising space independent of the geography.

25. The apparatus of claim 22, wherein the geography is a first geography and further including a second geography, wherein the at least one processor is to execute the instructions to:
obtain data from a first server associated with the first geography via a network; and
obtain data from a second server associated with the second geography via the network.

26. The apparatus of claim 25, wherein the at least one processor is to execute the instructions to cause at least one of the first server or the second server to navigate to a website of the Internet publisher.

27. The apparatus of claim 22, wherein the at least one processor is to execute the instructions to modify the first probing frequency to the second probing frequency in response to determining an advertising diversity increased.

28. The apparatus of claim 22, wherein the at least one processor is to execute the instructions to increase the first probing frequency to the second probing frequency based on a ratio of the first advertising deviation and the second advertising deviation.

* * * * *